US007837823B2

(12) United States Patent
 Griffin et al.

(10) Patent No.: US 7,837,823 B2
(45) Date of Patent: *Nov. 23, 2010

(54) MULTI-LAYER, LIGHT MARKABLE MEDIA AND METHOD AND APPARATUS FOR USING SAME

(75) Inventors: Neil Griffin, Royston (GB); Sam Hyde, Royston (GB); Aylwyn Scally, Royston (GB); Roger Clarke, Royston (GB); M. Scott Howarth, Clovis, CA (US); Richard Calusdian, Fresno, CA (US); Wilson B. Murray, Fresno, CA (US); Richard Hirst, Norwich (GB); Richard Evans, Fresno, CA (US)

(73) Assignee: Sinclair Systems International, LLC, Fresno, CA (US)

( * ) Notice: Subject to any disclaimer, the term of this patent is extended or adjusted under 35 U.S.C. 154(b) by 906 days.

This patent is subject to a terminal disclaimer.

(21) Appl. No.: 11/511,103

(22) Filed: Aug. 28, 2006

(65) Prior Publication Data

US 2007/0068630 A1 Mar. 29, 2007

Related U.S. Application Data

(63) Continuation-in-part of application No. 11/069,330, filed on Mar. 1, 2005, now Pat. No. 7,168,472.

(60) Provisional application No. 60/789,505, filed on Apr. 4, 2006, provisional application No. 60/712,640, filed on Aug. 29, 2005.

(51) Int. Cl.
 *B32B 37/00* (2006.01)

(52) U.S. Cl. ...................... 156/277; 156/363; 156/378; 156/387; 156/379.8; 156/541; 430/338; 430/351

(58) Field of Classification Search ................. 156/277, 156/363, 378, 387, 379.8, 541, DIG. 47; 430/332, 336, 338, 346, 348, 351, 363
See application file for complete search history.

(56) References Cited

U.S. PATENT DOCUMENTS

| 5,234,798 | A | 8/1993 | Heninger et al. |
| 5,536,778 | A | 7/1996 | Kreckel et al. |
| 5,766,828 | A | 6/1998 | Patel et al. |

(Continued)

FOREIGN PATENT DOCUMENTS

WO WO 2005/049332 2/2005

*Primary Examiner*—James Sells
(74) *Attorney, Agent, or Firm*—Bruce H. Johnsonbaugh

(57) ABSTRACT

A multi-layer laminate media is provided on which information may be applied in machine or human readable form on a visible front surface by the output of one or more lasers, or other high intensity light source. In a preferred embodiment, the media has three layers including a substrate, a thermochromic layer and a light absorbent layer such as carbon black located intermediate the media substrate and the thermochromic layer. The light absorbent layer is adapted to absorb light from the light source and convert the absorbed light into heat. The heat is immediately conducted into selected portions of the thermochromic layer which is in thermal contact with the light absorbent layer, causing portions of the thermochromic layer to change visual appearance such as color to create the desired mark. The invention includes a method and apparatus for using the media in conjunction with labeling produce items.

24 Claims, 11 Drawing Sheets

U.S. PATENT DOCUMENTS

| | | |
|---|---|---|
| 6,001,530 A | 12/1999 | Kidnie et al. |
| 6,140,008 A | 10/2000 | Hsieh et al. |
| 6,207,344 B1 | 3/2001 | Ramlow et al. |
| 7,021,549 B2 | 4/2006 | O'Rell et al. |
| 7,168,472 B2 * | 1/2007 | Hirst et al. ............ 156/387 |
| 2004/0213922 A1 | 10/2004 | Abrams et al. |
| 2004/0234756 A1 | 11/2004 | Mathiaparanam et al. |
| 2005/0115920 A1 | 6/2005 | Hiller et al. |

* cited by examiner

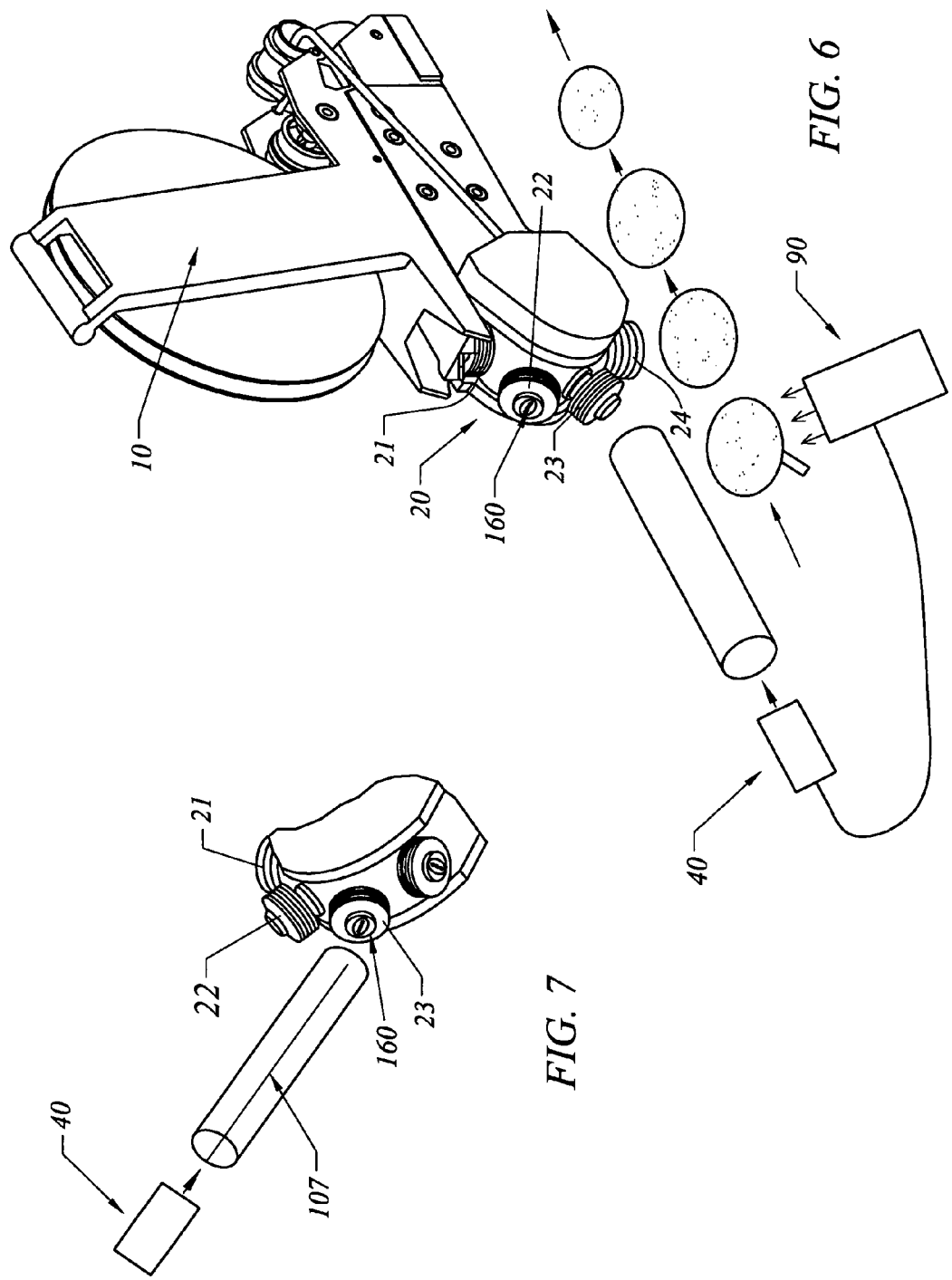

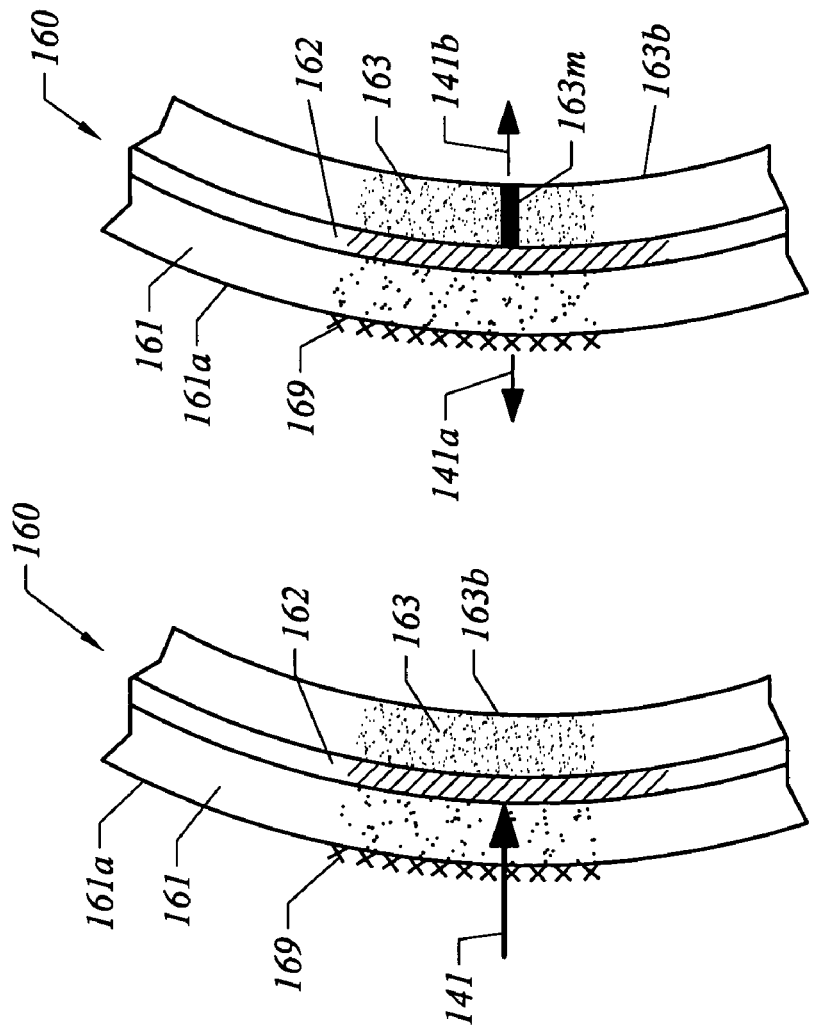

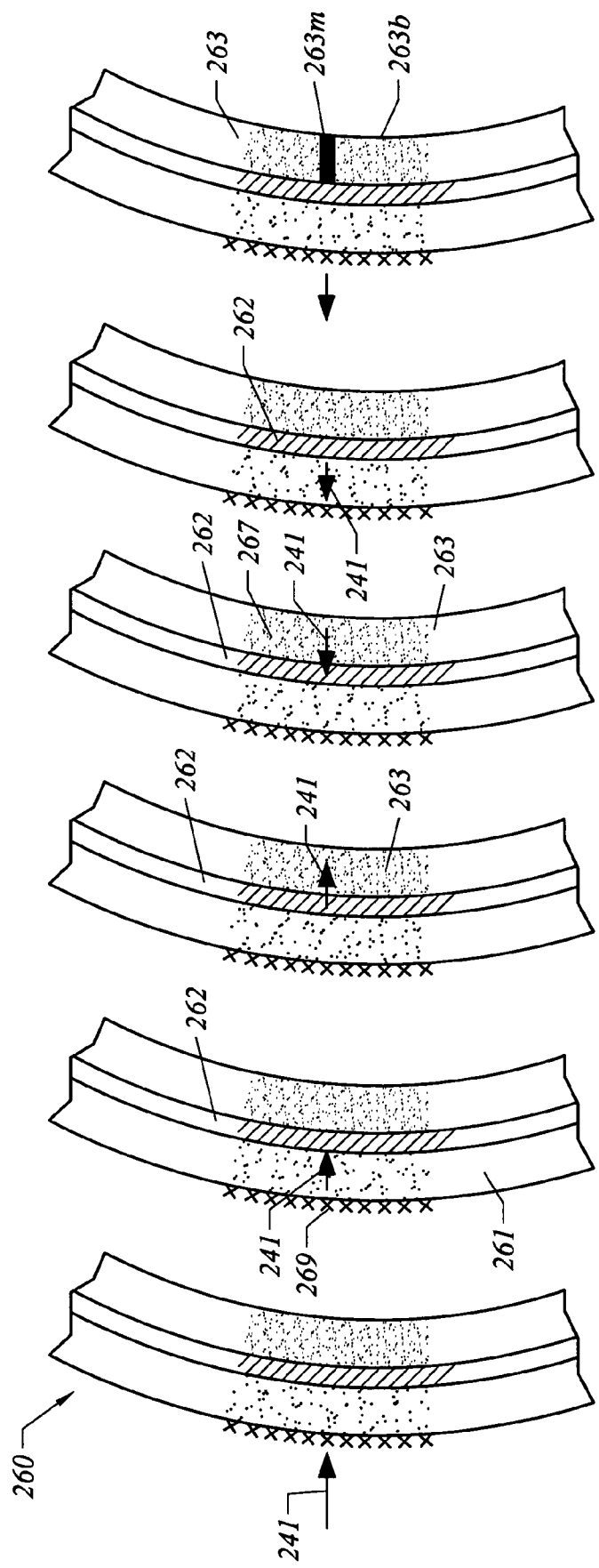

MULTI-LAYER, LIGHT MARKABLE MEDIA AND METHOD AND APPARATUS FOR USING SAME

CROSS-REFERENCE TO RELATED APPLICATIONS

This application is a continuation-in-part of U.S. application Ser. No. 11/069,330 filed Mar. 1, 2005 now U.S. Pat. No. 7,168,472. This application claims the benefit of and priority from U.S. provisional applications Ser. Nos. 60/712,640 filed on Aug. 29, 2005 and 60/789,505 filed on Apr. 4, 2006.

BACKGROUND AND BRIEF SUMMARY OF INVENTION

The present invention relates generally to laser (or other high intensity light) markable media used, for example, as labels in labeling machines and/or in film printing for, packaging, or for other printing applications, including point-of-sale, fax machines and laminate card (e.g. identity card) printers.

The labeling and packaging markets are demanding marking systems that are faster, more cost effective, capable of marking non-flat surfaces that have a longer lifetime, and which are capable of marking labels or packaging films "on the fly."

As known in the prior art, direct laser array marking of high volume label media has a number of advantages: no ink or ribbon, non-contact (giving longer head lifetime), and allowing non-flat media or printing on non-flat substrates; see published PCT patent application WO 05/049332—published Feb. 06, 2005.

As is also known in the prior art, diode laser arrays provide a low cost, compact, high-speed, high reliability solution for marking rolls of labels to be applied to produce.

A major disadvantage of prior art direct laser marking systems is that they require media sensitive to NIR (near infrared) wavelength of diode lasers. The traditional approach requires an NIR (near infrared) absorber with a narrow absorption band, because any residual absorption in the visible wavelength range will cause visible coloration of the media. In most cases, white or clear media is preferred, so coloration is undesirable. Additionally, narrowband NIR absorbers can be costly, adding significantly to the cost of the media, when used in applications like packaging/product labeling, where costs need to be extremely low.

The present invention overcomes the aforementioned problems with the prior art systems.

The present invention includes a way to create laser markable media for NIR lasers, while avoiding the need for narrowband NIR absorbers.

More particularly, one embodiment of the invention includes a novel "indirect" light markable, multi-layer media wherein laser output light (or other high intensity light) is absorbed and converted into heat by one layer of the media, is immediately thermally conducted into selected portions of an adjacent, thermochromic layer, and forms the desired image. The "indirect" markable media preferably utilizes a three layer label laminate (in addition to any adhesive layer), including a layer of light absorbent material (preferably carbon black) which overlies or is embedded in the front surface of a translucent plastic substrate. The media can be "back marked" or "front marked." In the case of "back marking," in one embodiment the preferred carbon black absorbs the output light energy of the laser (or other high intensity light) output beam or beams, after the beam or beams have passed through the translucent label substrate, and converts the absorbed light energy into heat; the heat is conducted into a thermochromic front or visible layer, causing desired portions of the thermochromic layer to change color (or visual appearance) to produce the desired image.

In a "front marking" mode, in one embodiment the light output beam passes through the "front" of the media, that is the thermochromic layer first, then enters the light absorbent layer.

The present invention includes further features for optimizing the overall efficiency of the system, including the use of reflective materials either in the thermochromic coating or on the front surface of the thermochromic coating, and in the use of obscuration techniques, to obscure the carbon black (or other) light absorbent layer, described in detail below.

The laser markable label prior art includes (in addition to WO 05/049332 noted above) the use of carbon black as an ablatable layer and as a donor [see U.S. Pat. No. 6,001,530 (see col. 4, lines 53-58); U.S. Pat. No. 6,140,008 (see col. 2, lines 57-59); U.S. Pat. No. 6,207,344 (see col. 2, lines 47-50); US 2005/0115920 A1 (see page 2, paragraph [0016]) and U.S. Pat. No. 7,021,549 (see col. 3, lines 39-43)]. However, that prior art does not teach or suggest the use of carbon black as a light absorbent material wherein the absorbed light is converted to heat and conducted into an adjacent thermochromic layer; neither does it teach or suggest a three layer label laminate having a light absorbent central layer, a thermochromic layer and a substrate.

The present invention is applicable to the automatic labeling of fruit and vegetables. More particularly, the invention provides an improved laminated label structure for use in a system for applying variable information "on the fly" to labels for single items of produce. The invention greatly reduces the number of labeling machines, label designs, and label inventory needed to automatically apply labels to produce. The invention simplifies packing operations and reduces costs by reducing the labor and label inventory required to automatically label produce.

A primary object of the invention is to provide a laser (or other high intensity light source) markable, multi-layer media for use as labels or in film printing incorporating a low cost light absorbent layer for NIR lasers, while avoiding the need for expensive narrowband NIR absorbers and removing residual media coloration.

A further object of the invention is to provide an "indirect" laser (or other high intensity light source) markable, multi-layer media which can be marked either through the front or back surface of the media.

A further object of the invention is to provide a laser markable, multi-layer media in which a low cost, broadband light absorbent layer, such as carbon black, for example, absorbs laser light output and converts absorbed light into heat, and the absorbed heat is conducted into portions of an adjacent thermochromic layer to form the desired image.

Another object of the invention is to provide a laser (or other high intensity light source) markable, multi-layer media including a light absorbent layer as noted above together with obscuration means to prevent said light absorbent layer from being visible to the naked eye.

A further object of the present invention is to provide a multi-layered media for use in automatic labeling machines for applying labels to single items of produce wherein variable coded information is applied to each label immediately prior to its application to an item of produce.

A further object of the invention is to provide a laminated label design capable of having variable coded information applied to it after the label has been transferred to the tip of a bellows in a rotary bellows applicator, which requires only minor modifications to the rotary bellows label applicating machine.

A further object of the invention is to provide a laminated label capable of having variable coded information applied to it for use in a rotary bellows applicator without having to reduce the operating speed of the rotary bellows applicator.

Further objects and advantages will become apparent from the following description and drawings wherein:

BRIEF DESCRIPTION OF THE DRAWINGS

FIGS. 6 and 7 are perspective illustrations of portions of an automatic produce labeling machine, in which the labels of the present invention are advantageously used;

FIGS. 9A and 9B are schematic illustrations showing how light energy is absorbed by the central light absorbing layer, converted to heat and conducted into selected portions of the thermochromic layer to produce the desired mark;

FIGS. 10A-10F illustrate the use of reflective materials in the thermochromic layer to cause the reflected output beam to pass through the light absorbent layer a second time in order to increase overall efficiency of the technique;

FIGS. 11A and 11B are illustrations of what a typical mark produced by the invention would look like; FIG. 11A shows typical dimensions and FIG. 11B illustrates the actual size of a typical mark.

DETAILED DESCRIPTION OF THE DRAWINGS

"Back Side" Marking of Three Layer Media

Figure 1A:
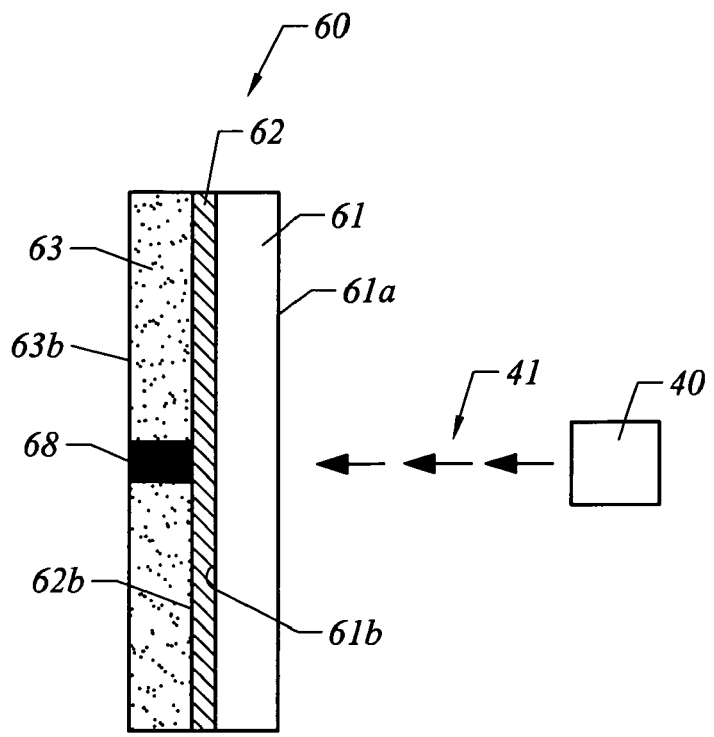
FIGS. 1A and 1B are schematic representations illustrating the "back marking" of the three layer laminate media of the present invention.
Figure 1B:
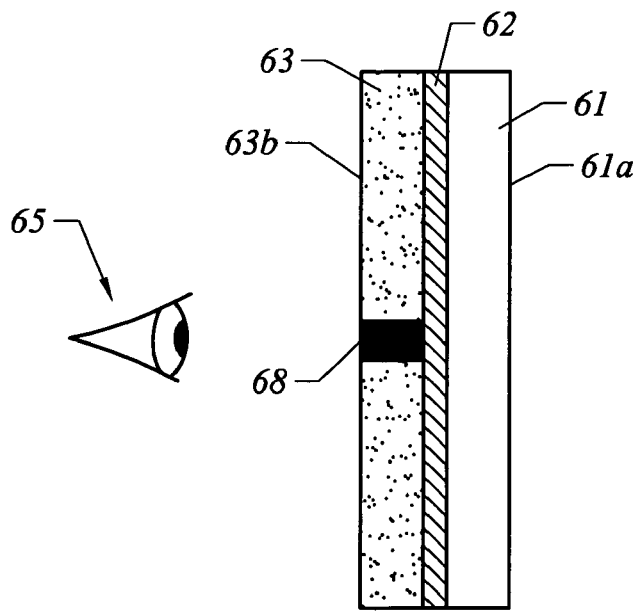

FIGS. 1A and 1B illustrate the overall concept of "back marking" of the novel multi-layer laminate label 60. Label 60 comprises a translucent plastic substrate 61 having a back surface 61a and a front surface 61b. A layer of light absorbent material 62 (preferably carbon black) is carried by the front surface 61b of substrate 60 by either being applied as a film carried by front surface 61b of substrate 61 or by being embedded in substrate 61 adjacent the front surface 61b of substrate 61. A thermochromic layer 63 is preferably carried by and is in thermal contact with the front surface 62b of light absorbent layer 62. Thermochromic layer 63 has a back surface 63a and front surface 63b. Front surface 63b forms a front, visible surface of label 60. The output 41 of laser coding means (or high intensity light source) 40 is partially absorbed by light absorbent layer 62 and converted to heat. Light source 40 may be a one or more $CO_2$ lasers, one or more diode lasers, an addressable array of lasers or one or more LEDs, for example. The output 41 of light source 40 is caused to form the desired image by either manipulation of the light source or by programming of a laser array, all is known in the art. The absorbed heat in layer 62 is immediately conducted into thermochromic layer 63 and causes selected portions of layer 63 to change color or otherwise change visual appearance to produce the desired image. The phrase "change visual appearance" means a change of color, darkness or other visually detectable change of appearance.

FIGS. 1A and 1B illustrate the "back marking" embodiment of the present invention, where the laser (or other light source) radiation 41 is applied through the back or rear (non-viewed) surface 61a of the media 60. Media 60 includes three layers; a front layer 63, a rear layer 61, and an inexpensive middle, light absorbent layer 62. FIG. 1B shows a viewer's eye 65 viewing the resultant mark 68. The light is absorbed by an inexpensive, light absorbent layer 62 that absorbs a broad spectrum of light, including NIR, and it also absorbs visible light. Such a material can be much more readily available as an ink and much cheaper (about 80% cheaper) than narrow-band NIR absorbers—an example is carbon black. Furthermore, it can be activated by light sources of a wider wavelength range, including visible light. Adjacent to the absorbing layer 62 is a front thermochromic layer 63 that performs two functions: it changes color or otherwise changes in visual appearance in response to heat generated (thermochromic) when the applied light radiation is absorbed by the light absorbing layer 62, and conducted into thermochromic layer 63, and it preferably obscures the light absorbing layer 62 so that layer 62 either has reduced visibility or is not visible to the naked eye when the media is viewed from the front surface as shown in FIG. 1B. The color (or visual appearance) change function can be achieved by any thermochromic chemistry, such as those used in standard direct thermal media (for example a coating consisting of leuko dye and color activator). A further example is a coating comprising a color activator, a color developer and a sensitizer. Thus, this is already a mass-market product available at low cost. The obscuration function can be further enhanced by adding a scattering material to the thermochromic front layer 63. For example, $TiO_2$ particles of an appropriate size are very effective at providing obscuration in a thin layer. An additional benefit of a light scattering material in the color-change front layer 63 is that light that is not absorbed during one pass through the absorbing layer may be reflected or back-scattered by the light scattering material in the front layer (as shown in FIGS. 9A-9B and 10A-10F and described below), thereby passing through the absorption layer 62 again for an additional chance to be absorbed.

One restriction of this design is that any substrate used as rear layer 61 must be translucent, to allow the light to reach the absorbing layer 62. The word "translucent," as used herein and in the claims, means either transparent to or sufficiently transmissive of the light output beam to form the desired image. This may be a polymer, such as, for example and without limitation, polyethylene, polypropylene and polyester.

To achieve best sensitivity, the peak temperature at the color change layer 63 for a given laser energy should be maximized. This can be done by:

using a thin highly heat conducting and light absorbing layer 62 (an alternative to carbon black is graphite or carbon nanotubes which have an improved conductivity).

using a thin color change (thermochromic) layer 63, again with a good thermal conductivity to ensure that the heat reaches the top or front visible surface of the layer and the mark visibility is maximum.

using an absorbing layer 62 with less than 100% absorption, so that the distribution of absorption through the absorbing layer is shifted towards the surface close to the color change (thermochromic) layer 63.

if an overcoat layer (not shown) is used on top of the color change layer 63 (e.g., to provide solvent resistance), this layer should be as thin as possible.

It is significant to note that the "back side" laser marking of media 60, shown in FIGS. 1A and 1B, may be used in a variety of printing, labeling and packaging applications.

"Front Side" Marking of Three Layer Media

Figure 2B:
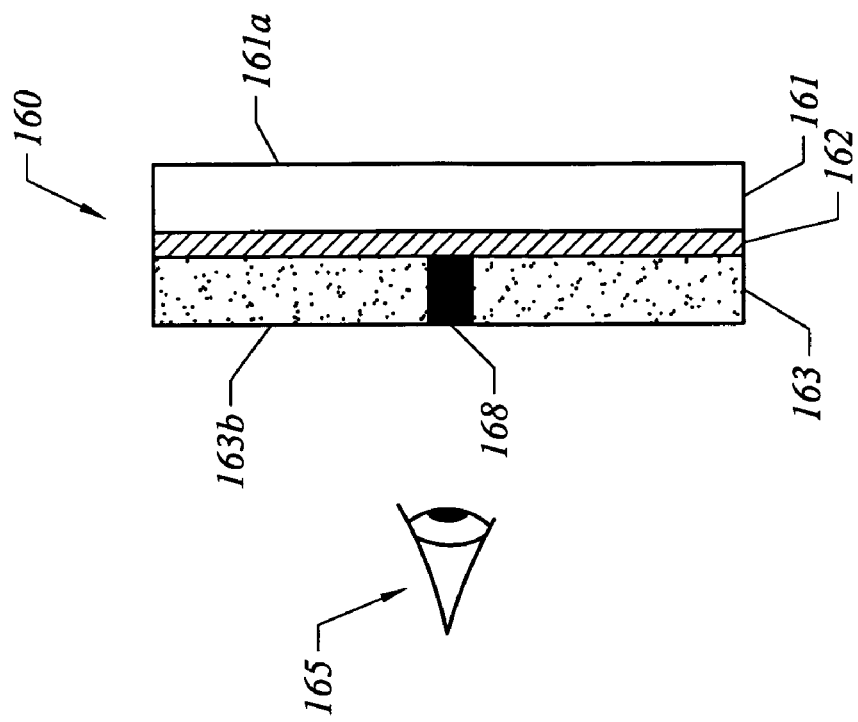
FIGS. 2A and 2B are schematic illustrations of the "front marking" technique for marking the three layer media of the present invention.
Figure 2A:
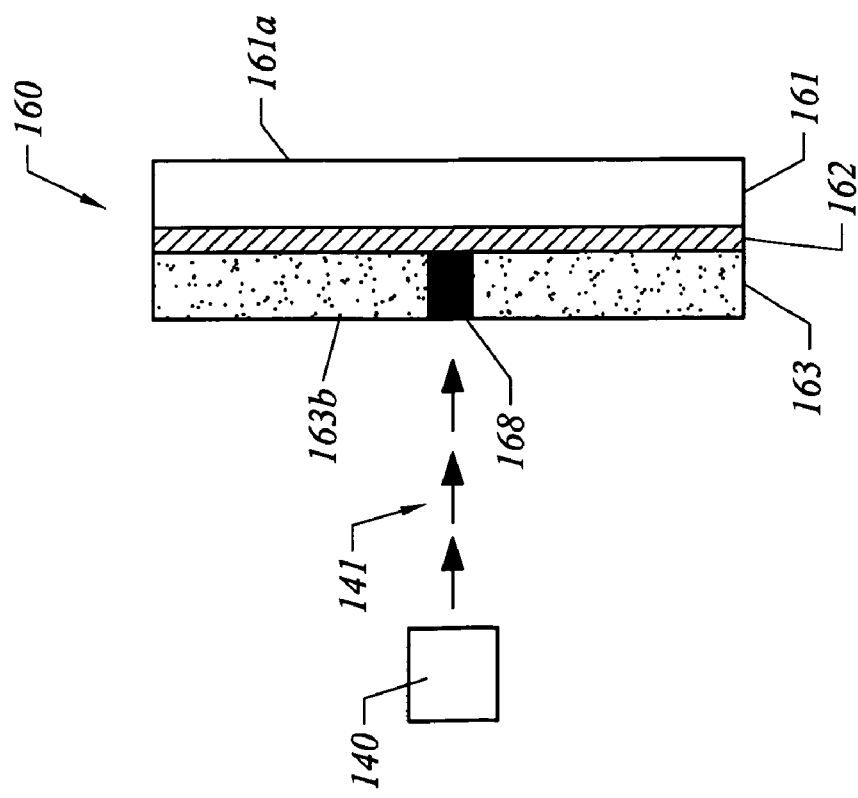

FIGS. 2A and 2B illustrate direct laser marking through the front side of a three layer laminate media 160 according to the present invention. This embodiment can be used in applications such as labeling, packaging or other printing applications. As shown in FIGS. 2A and 2B, the laser beam (or other high intensity light beam such as a laser diode array) 341 is emitted from light source 140 and is applied to media 160 having a front face 163b, rear face 161a and having three separate layers, front layer 163, rear layer 161 and an inexpensive middle or central heat absorbing layer 162. This time, front marking is used to mark the front layer 163, but the broadband absorber 162 (e.g., carbon black) is retained, with its low cost advantage. This time, to avoid the absorbing layer 162 being visible by viewer 165 looking at the resultant mark 168 on front surface 163b (as shown in FIG. 2B), the overlying thermochromic front layer 163 is made to be opaque in the visible range, but to still allow light through at the activation wavelength, typically 700 nm-1600 nm. This may be achieved by incorporating particles of a dielectric material whose refractive index mismatch to that of the matrix of the thermochromic front layer 163 is small at the excitation wavelength but large in the visible wavelength range.

To maximize sensitivity in this case, a high absorption coefficient in the absorbing layer 162 is required to maximize the proximity of the generated heat to the thermochromic layer 163. Minimizing the thickness of the thermochromic layer 163 and any overcoat layer (not shown) will also maximize sensitivity by minimizing the heat spreading.

The marking systems shown in FIGS. 1A, 1B, 2A and 2B are "indirect" light marking systems or techniques in the sense that the output light is first absorbed by the light absorbing layer (62,162), converted to heat by the light absorbing layer (62,162), and thereafter thermally conducted into the thermochromic layer (63,163) to create the desired mark.

Figure 3A:
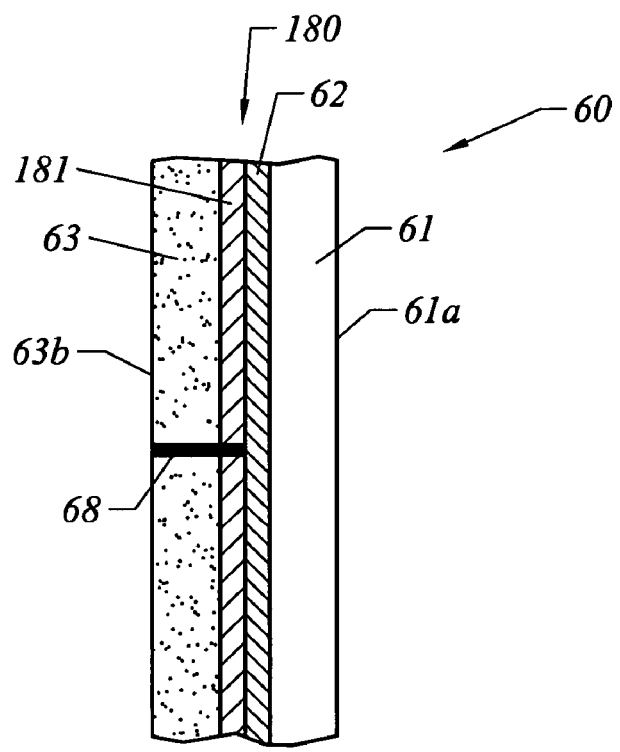
FIGS. 3A and 3B illustrate the multi-layer media 60 of FIGS. 1A and 1B including an optional obscuration means.
Figure 3B:
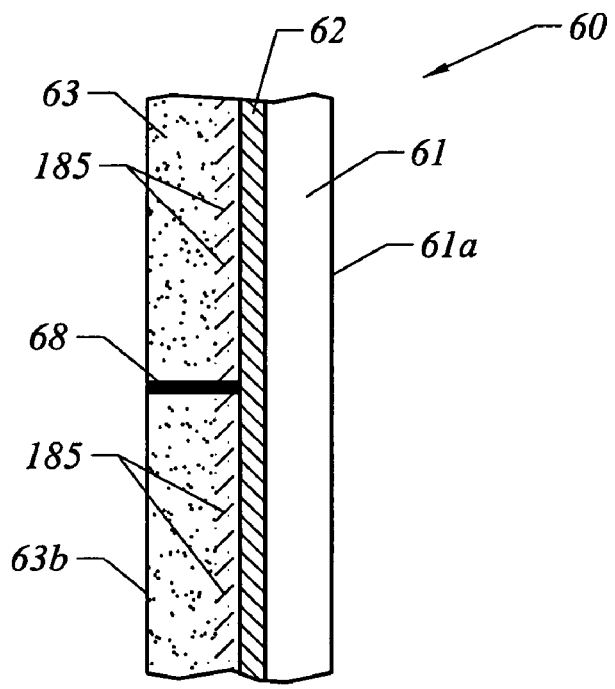

FIGS. 3A and 3B illustrate the multi-layer media 60, as shown in FIGS. 1A and 1B, including an optional obscuration means 80. As shown in FIG. 3A, substrate 61 has back surface 61a, as described above. Light absorbent layer 62 is shown in FIG. 3A as carried on the surface of substrate 61. As shown in FIG. 3A, obscuration means 180 is a layer of material 181 that is located between the light absorbent layer 62 and thermochromic layer 63. The purpose of obscuration means 80 is to reduce the visibility of the light absorbent layer 62 to the naked eye. The layer 181 may be formed from one or more materials selected from the group consisting of $TiO_2$ particles, calcium carbonate particles, wax powder and a polymer matrix in which gas bubbles are formed. The obscuration layer 181 is a microscopic mixture of at least one translucent material together with one of the materials selected from the group identified above, provided that the translucent material has a different refractive index from the materials in said group. The obscuration layer 181 should preferably be thin and have a high thermal conductivity to achieve the best thermal contact between the light absorbent layer 62 and the thermochromic layer 63.

Alternatively, the obscuration means 80 may comprise a variable obscuration layer 181 wherein the thermochromic affect is achieved through varying the degree of obscuration (i.e., not using leuko dyes). For example the layer 181 may be translucent in the absence of applied heat, and applied heat conducted from light absorbent layer 62 causes it to become opaque, for example, by formation of gas bubbles within a polymer matrix, thereby obscuring the absorbent layer. Alternatively, the obscuration layer 181 may have an opaque status in the absence of heat, and the heat conducted from light absorbent layer 62 makes the obscuration layer 181 translucent, for example, by melting of wax powder in a gas/wax mixture, thereby allowing the dark absorbing layer 62 to be seen in the exposed areas.

FIG. 3B illustrates an alternate embodiment of the invention wherein the obscuration means 185 does not form a separate layer, but rather is embedded in the thermochromic layer 63. The alternate obscuration means 185 performs substantially the same function as the obscuration means 180 as shown in FIG. 3A. The obscuration means 185 is preferably located as close as possible to the light absorbent layer 62, but in any event is positioned between the light absorbent layer 62 and the front visible surface 63b of thermochromic layer 63.

The obscuration means 80 and/or 85 can also be applied to the media 160 illustrated in FIGS. 2A and 2B in the same fashion as illustrated in FIGS. 3A and 3B as applied to media 60. Obscuration means 80 and/or 85, as used in the "front marking" technique of FIGS. 2A,2B, is translucent to the wavelength of the light source output beam.

Figure 4:
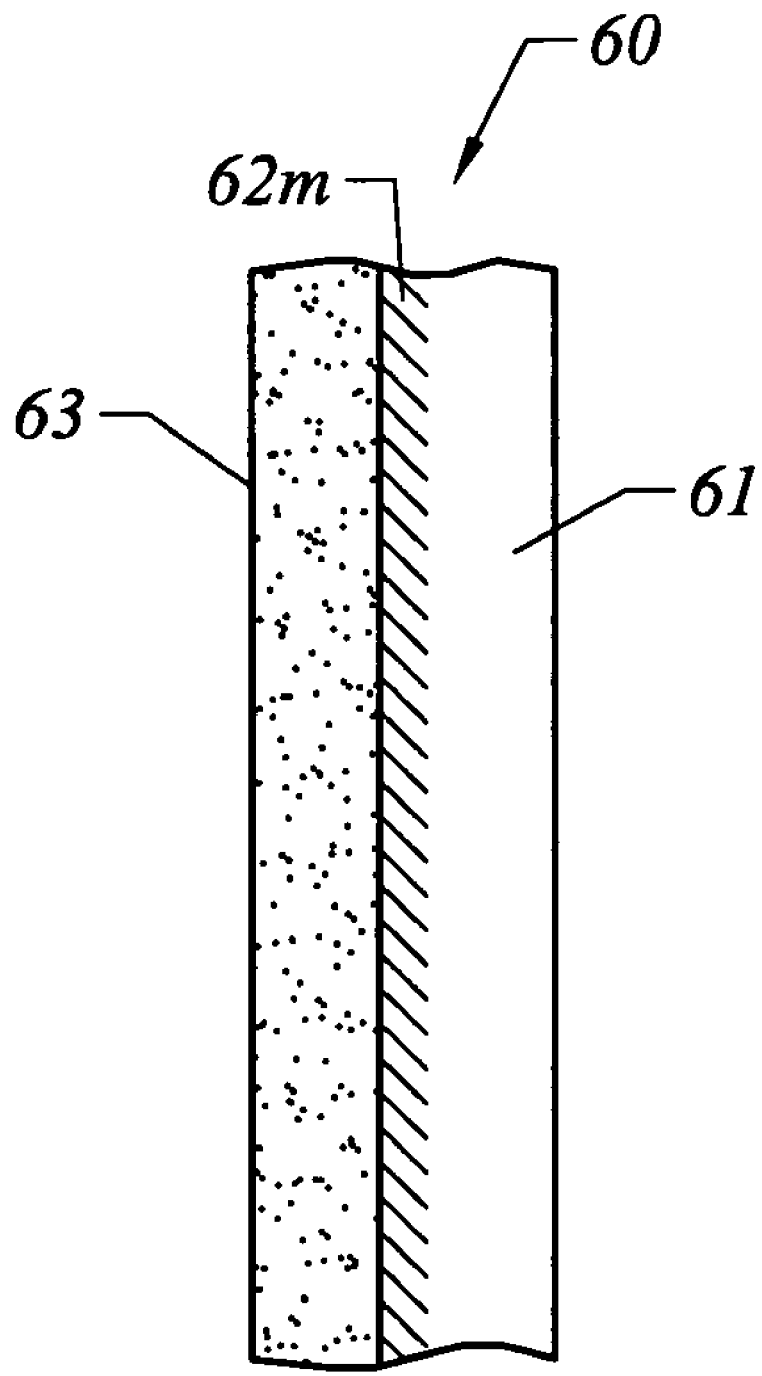
FIG. 4 is a schematic illustration of media 60, as shown in FIGS. 1A and 1B, wherein the light absorbent layer is embedded in the substrate, as opposed to being carried on the surface of the substrate layer.

FIG. 4 is a schematic illustration of media 60, as shown in FIGS. 1A and 1B, wherein the light absorbent layer 62m is embedded in substrate layer 61. The light absorbent layer 62m is preferably carbon black which is extruded into the plastic substrate 61. The preferred carbon black layer must be as thin as possible and as dense as possible to insure that enough light output energy is converted to heat and efficiently conducted into the thermochromic layer 63. Thermochromic layer is preferably applied to substrate 61 by flexographic printing.

As an alternative to embedding the light absorbent layer in substrate 61, as shown in FIG. 4, the light absorbent layer 62 or 162 (FIGS. 1A,1B, 2A and 2B) may be applied to said substrate by flexographic printing and the thermochromic layer 63 or 163 then applied to said light absorbent layer 62 or 162 by flexographic printing to produce the three distinct layers shown in FIGS. 1A,1B, 2A and 2B.

Figure 5A:
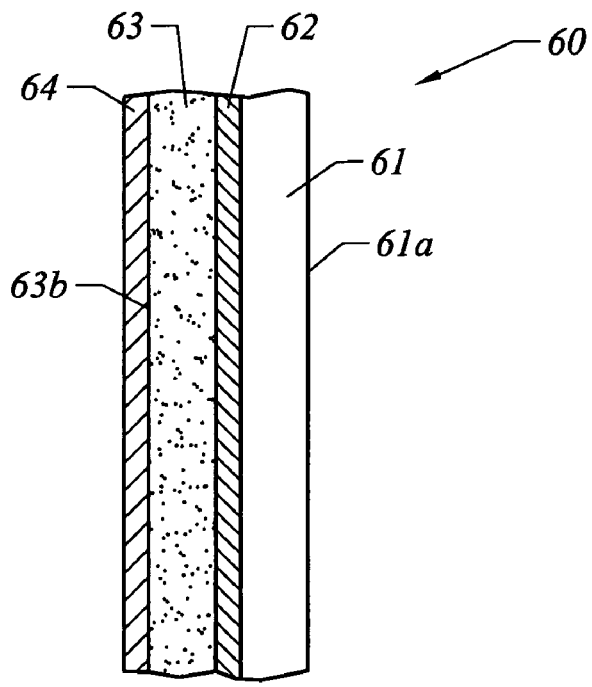
FIG. 5A is a schematic representation of the media of FIGS. 1A and 1B further having an optional reflective coating applied to the front surface of the media.

FIG. 5A is a schematic representation of the media 60, shown in FIGS. 1A and 1B, wherein an optional reflective coating 64 has been applied to the front surface 63b of thermochromic layer 63. Coating 64 is either carried by layer 63 or is adjacent to front surface 63b of layer 63. The purpose of reflective layer 64 is to reflect light back into light absorbent layer 62 which was not absorbed by layer 62 as the output beam first passed through layer 62.

Figure 5B:
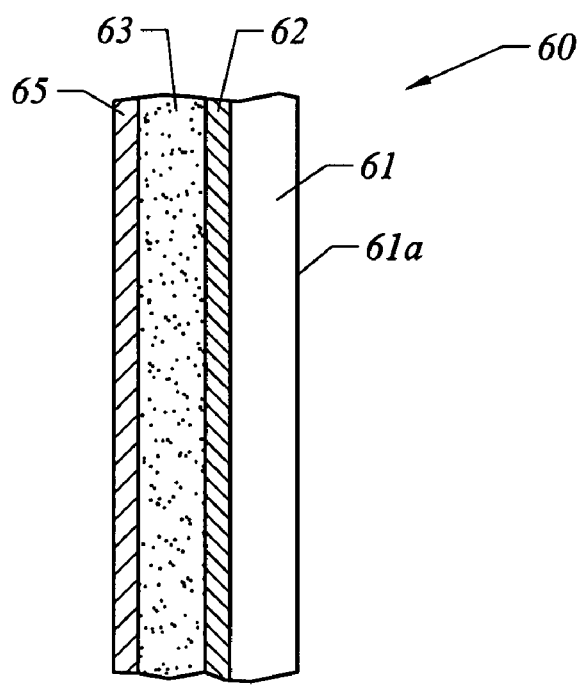
FIG. 5B is a schematic representation of the media of FIGS. 1A and 1B illustrating an optional protective coating.

FIG. 5B is a schematic representation of the media 60 of FIGS. 1A and 1B illustrating an optional protective coating 65 which is preferably a clear protective overcoat of, for example, varnish, which protects the thermochromic layer 63.

Use of Multi-Layer Laminate for Labeling Produce

The prior art typically requires separate labeling machines and label designs for each price look up or "PLU" number. PLU numbers are required by retailers to facilitate quick handling and accurate pricing of produce at checkout. For example, in order to apply labels denoting "small" or "medium" or "large" size designations for apples, the prior art typically requires three separate labeling machines, three separate label designs, and three label inventories. If a packhouse packs more than one brand, the equipment configuration is duplicated. This label application equipment is expensive, requires maintenance, and requires a significant amount of physical space on the sizer and thereby restricts where the packing operation may place their drops to further pack the produce. The present invention facilitates the same labeling in the above example with only one labeling machine and one label design.

The most widely used type of produce labeling machine utilizes a rotary bellows applicator. It is advantageous to minimize any modifications to existing produce labeling machines in creating a system for applying variable coding "on the fly." Similarly, the operating speed of existing labeling machines must be maintained.

The present invention solves the problem of applying variable coded information "on the fly." No significant modification of existing rotary bellows applicators is required. No reduction of labeling speed is required. In a preferred embodiment, the invention uses one or more laser output beams to pass through the back or reverse surface of the label (on which an adhesive layer is carried), through the label substrate, and to cause an image to be formed on the front or visible surface of the label.

The prior art includes various attempts to meet the increasing demand for a greater variety of labels and variable information. One approach by the prior art (U.S. Pat. No. 6,179,030) is to position produce labeling machines downstream of sizing equipment so that all labels indicate the same size of produce. Of course, this approach involves the expense of modifying conveying equipment and is limited to the application of sizing information.

Another attempted solution of the prior art has been to apply variably coded information to the front or visible label surface before the label is transferred to the tip of a bellows (see U.S. Pat. No. 6,257,294). The difficulty with that attempted solution is that the label is being printed as it is twisting and bending as it is transferred from the label carrier strip to the tip of the bellows. A complex array of air streams is provided to try to control the label and to dry the ink. The applicants herein are aware of that apparatus and the understanding of applicants is that approach has not been accepted commercially.

Another possible approach is to apply variable information to the labels upstream of the point at which the labels are transferred to the rotary bellows. The difficulty with that approach is that the requirements for sensors and timing devices increases the cost significantly. For example, to sense the variable information for 24 items of produce, and to be able to apply a newly printed label to a piece of produce that is 24 "slots" away from being labeled, requires the use of greater memory and complex timing and synchronization circuitry to assure that the proper information is applied to the proper item of produce; all at prohibitive cost.

The present invention overcomes the above-mentioned difficulties of the prior art attempts. The present invention avoids the reconfiguration of sizing and conveying equipment required by U.S. Pat. No. 6,179,030. The present invention, in sharp contrast to U.S. Pat. No. 6,257,294, applies the variable coded information to the label after the label is transferred to the tip of a rotary bellows, and avoids the problems inherent in that prior art attempted solution. Furthermore, the present invention, in further contrast to U.S. Pat. No. 6,257,294, avoids the use of sprayed ink and the required drying time by utilizing one or more laser beams that react instantly with the novel label laminate of the invention. The present invention also avoids the use of costly sensing and timing circuits by applying the variably coded information immediately before the label is applied to the appropriate produce item.

The present label laminate invention is designed particularly for use in conjunction with the system disclosed in U.S. patent application Ser. No. 11/069,330, filed Mar. 1, 2005, and entitled "Method and Apparatus for Applying Variable Coded Labels to Items of Produce," which application is incorporated herein by reference as though set forth in full (the '330 application). Pertinent aspects of the '330 application are included below for the sake of explaining the present invention. A more complete description of the labeling machinery is contained in the '330 application and references referred to therein. The use of rotary bellows applicators, as shown in the '330 application, has become the standard of the produce labeling industry. Any departure from the use of a rotary bellows applicator head would require significant investment in new labeling apparatus.

The present invention requires only minor modification to the standard rotary bellows applicators. The present invention does not utilize ink which requires relatively lengthy drying time. The present invention applies the information while each label is moving, but in a relatively stable position, after it has been transferred to the tip of a bellows, maximizing image clarity. The present invention is capable of forming images at a speed commensurate with maximum speeds of the existing rotary bellows label applicators.

FIGS. 6 and 7 herein are reproduced from the '330 application. As shown in FIGS. 6 and 7, a label cassette 10 feeds labels one at a time onto the tips of bellows 21-24 of rotary bellows applicator 20, as known in the art. A laser coding means 40 (which could be a laser, laser array, LED or other high intensity light source) is utilized to produce variable human or machine readable codes on a pressure sensitive thin film produce label 160 (as shown in FIG. 6) just prior to application of the label to a produce item. The codes are produced in response to sensing means 90 which senses variables such as size or color, as described more fully in the '330 application. The code is produced preferably by marking the label 60 from the backside through the adhesive and film layers, as shown in FIGS. 1A and 1B generally, and as described in detail below.

Figure 8:
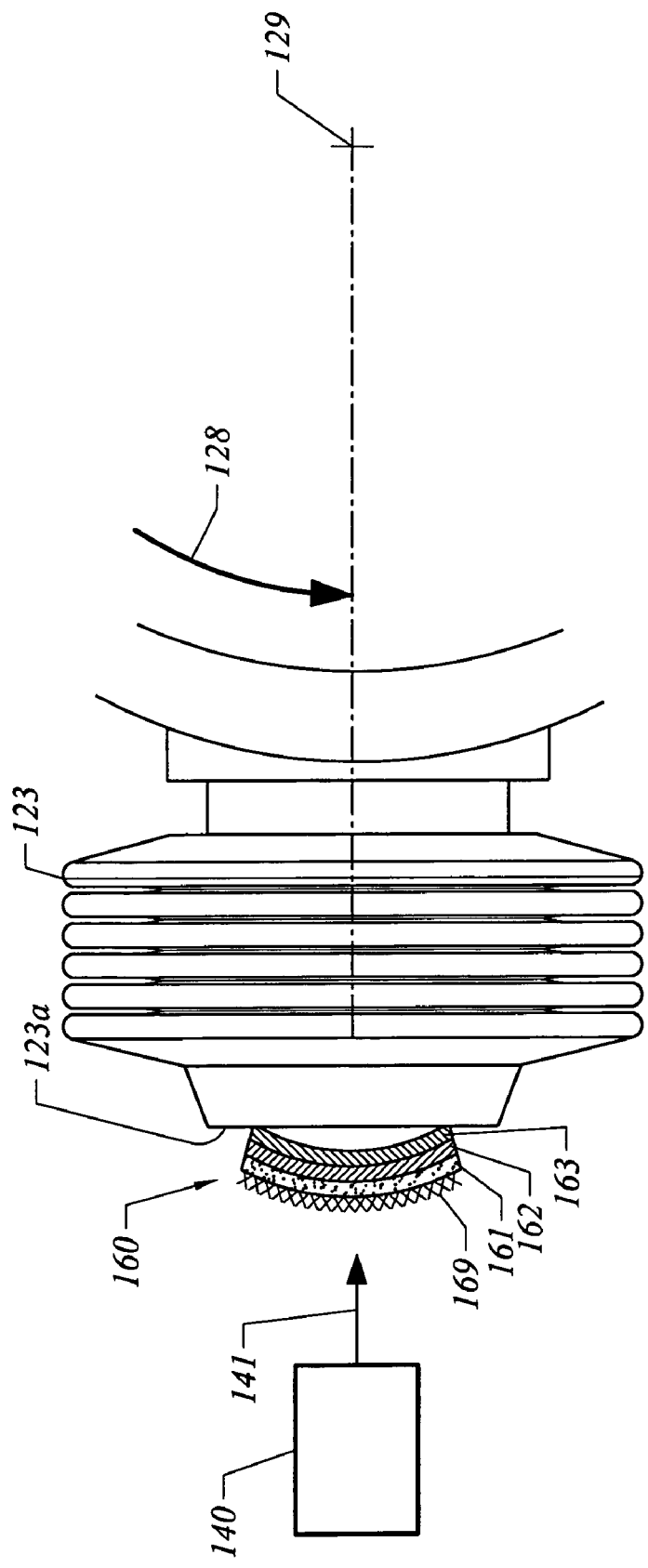
FIG. 8 is a schematic illustration showing the use of the "back marking" technique for marking the three layer laminate of the present invention in the produce labeling machine illustrated generally in FIGS. 6 and 7.

FIG. 8 illustrates schematically the actual environment in which the multi-layered laminate label 160 of the present invention is marked. Label 160 of FIGS. 8, 9A and 9B is the same as label 60 of FIGS. 1A and 1B, except that label 160 includes a fourth layer of translucent adhesive 169 and is rotated 180° from its orientation in FIGS. 1A and 1B. The front or visible surface 163*b* is on the right hand side of media 160 in FIGS. 9A and 9B whereas the front or visible surface 63*b* is on the left hand side of media 60 in FIGS. 1A and 1B. The multi-layered label 160 is shown in FIG. 8 as it is being carried on the tip 123*a* of bellows 123. The label 160 is shown forming a curved surface because of the curved or dome shape of the surface of bellows tip 123*a*. Bellows 123 rotates around axis of rotation 129 in the direction of arrow 128. The label 160, shown in FIGS. 6-8 but shown best in FIG. 8, includes a translucent plastic substrate 161, an inexpensive light absorbent layer (preferably carbon black) 162 and a thermochromic layer 163. The adhesive 169 is carried by the back surface 161a of plastic substrate 161 and is utilized to adhere the label 160 to the item of produce to which the label is about to be applied. A laser coding means (or other high intensity light source) 140 is illustrated schematically emitting an output beam 141. It is to be understood that laser coding means 140 can be preferably an array of addressable solid state semi-conductor diode lasers or it can be a single $CO_2$ laser whose output beam can be moved by galvanometric or other means known in the art. The bellows 123, as illustrated in FIGS. 6-8, is moving between two index stations at which the bellows momentarily stops at low label application speeds; the bellows may not stop at higher label application speeds. According to the present invention and as described in detail below, it is advantageous to mark the label 160 as the bellows 123 is moving at a relatively steady rate between two of its index positions.

FIGS. 9A and 9B are schematic representations of the methodology used in the label marking illustrated in FIG. 8. As shown in FIG. 9A, the laser output beam 141 has penetrated the translucent adhesive layer 169 and the translucent substrate 161 and is about to enter the light absorbent, carbon black layer 162. The thickness of the arrow representing the laser output beam 141 represents the energy contained in the output beam as it begins to enter absorbent layer 162.

As shown in FIG. 9B, the laser beam 141 has passed through the light absorbent layer 162, has transferred a major portion of its energy into light absorbent layer 162 and remnants of beam 141 have broken into a reflected fragment 141a which is reflected backwardly through the substrate 161 and adhesive layer 169. A second fragment 141b simply passes through the thermochromic layer 163 and is lost. The reduced width of the arrows 141a and 141b representing beam fragments illustrates that roughly 70% of the energy of the beam 141 was absorbed by light absorbent layer 162 and conducted immediately into thermochromic layer 163 as shown by a portion 163m of thermochromic layer 163 which has changed color (or otherwise changed its visual appearance) to form a portion of the mark in accordance with the invention.

FIGS. 10A through 10F illustrate a further aspect of the invention wherein a laser output beam 241 is shown entering a multi-layer laminate label 260. As shown in 10B, the output beam has passed through the translucent adhesive layer 269 and the translucent plastic substrate 261 and is about to enter the light absorbent layer 262.

As shown in FIG. 10C, the laser beam 241 is shown as it passes through the light absorbent layer 262, giving up most of its energy into the light absorbent layer and retaining approximately 30% of its energy as it enters the thermochromic layer 263.

FIG. 10D illustrates that the laser beam 241 is reflected backwardly by reflective particles 267 that are embedded into thermochromic layer 263. The reflected laser beam is shown in FIG. 10D as it begins to pass through the light absorbent layer 262 a second time.

FIG. 10E illustrates that the laser beam 241 has passed through the light absorbent layer 262 a second time and has given up a major portion of its remaining energy, but has contributed additional light energy to light absorbent layer 262. The light energy from laser beam 241 passing through the light absorbent layer twice is immediately converted into heat energy and conducted into thermochromic layer 263, which is in thermal contact with light absorbent layer 262, and causes a portion 263 m of thermochromic layer 263 to change color (or otherwise change its visual appearance).

As an alternative to embedding scattering material in the thermochromic layer 263, as illustrated in FIGS. 10A-10F, a reflective coating may be applied to the front surface 263b of thermochromic layer 263, which would cause the remnants of the laser beam to be reflected backwardly through light absorbent layer 262 wherein a major portion of the remaining energy of the laser output beam is transferred into the light absorbent layer 262.

Figure 11A:
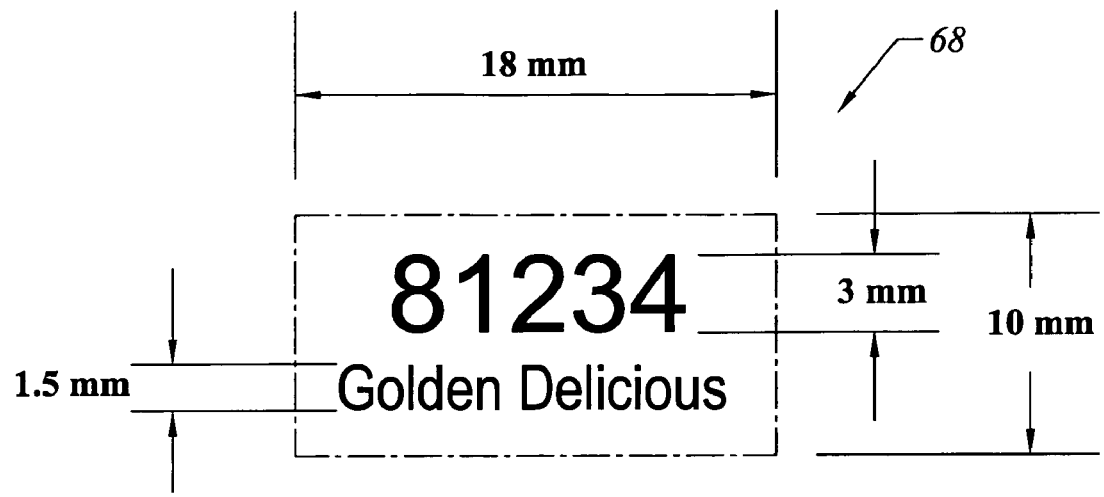
Figure 11B:

FIGS. 11A and 11B are illustrations of what a typical mark 68 produced by the invention would look like; FIG. 11A shows typical dimensions and FIG. 11B illustrates the actual size of a typical mark 68.

Direct Laser Marking of Two Layer Media

In addition to the above embodiments, the invention also includes direct laser marking utilizing a two layer media having a plastic substrate layer and a thermochromic layer.

Figure 12:
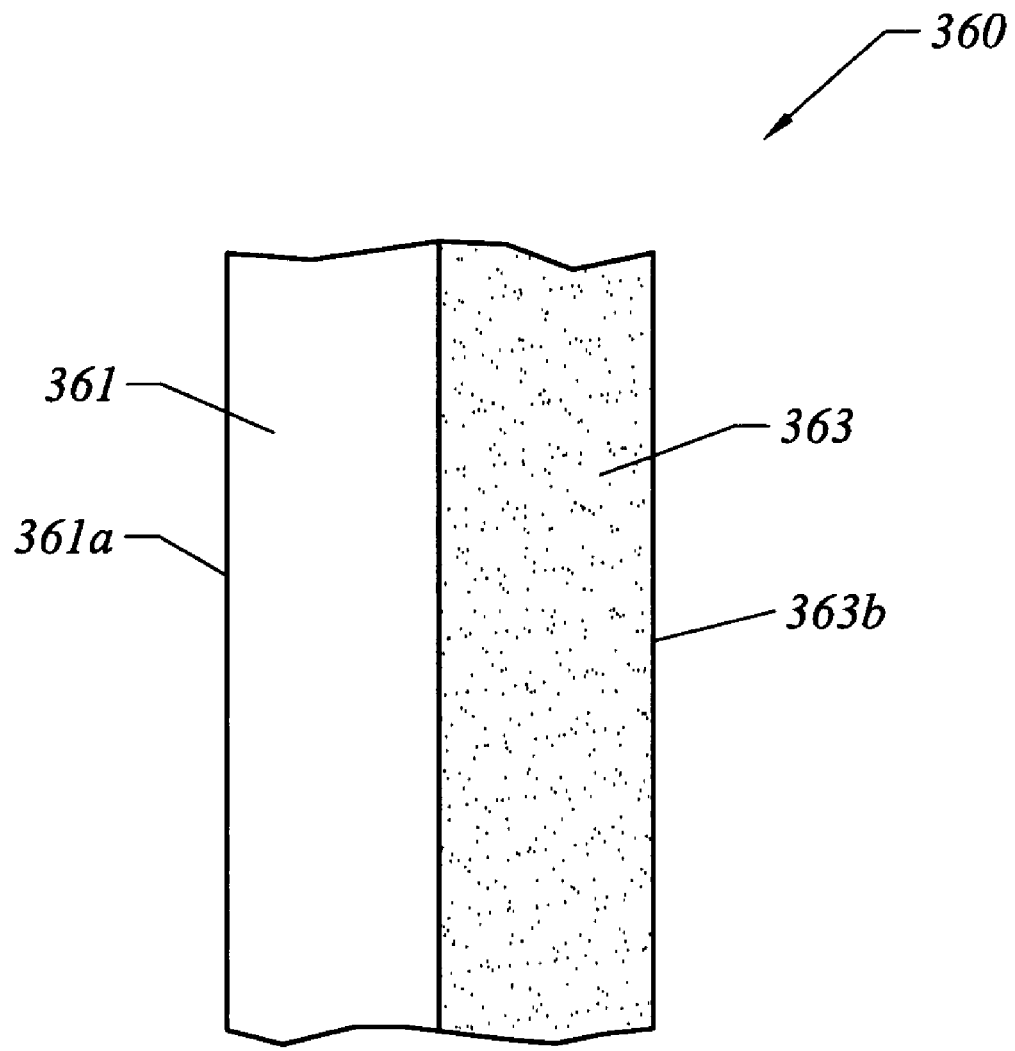
FIG. 12 is a schematic representation of a two layer form of the invention including a substrate layer and a thermochromic layer.

As shown schematically in FIG. 12, a two layer media 360 includes a substrate 361 and a thermochromic layer 363. The back or reverse side of media 360 is the back or reverse side 361a of substrate 361. The front visible surface of the media 360 shown in FIG. 12 is surface 363b which is the front surface of thermochromic layer 363.

Laminated Label Material Requirements for Two Layer Media

The following is a general description of the laminated label requirements for a two layer label for achieving acceptable quality fruit and vegetable labels.

The laminate substrate 361 is preferably a Low Density Polyethylene (LDPE) film approximately 40 μm thick.

The media and its components must comply with governmental regulations concerning food, health and safety aspects that govern use of similar products.

The substrate 361 must be free of any slip agents or other additives with the exception of minimal amounts of natural silica anti-blocking agent and polymeric processing aid (not present in surface layer of finished film), also white masterbatch in the case of the white film products.

The label film or substrate 361 is an extruded film with a white master-batch present. The white master-batch typically consists of $TiO_2$, Lithopone, Kaolin Clay or other appropriate whitener.

Example Methods

There is no one method to achieve an acceptable mark on a PE label. However, there are several major components that must be tuned or addressed in order to create the desired result. Table 1 presents five example methods and the relative primary components that achieved acceptable marks on PE labels. Following the table, a detailed description of the various components for each example are defined and outlined.

TABLE 1

The following table gives several methods that were developed to achieve a readable mark with the given laser source. Shown are some of the more important features required to achieve the mark.

| Method | Laser Source | Wavelength nm | Density J/cm² | NIR Absorber | Film w/Filler |
|---|---|---|---|---|---|
| 1 | $CO_2$ | 10,600 | 0.69 | N | LDPE w/TiO2 |
| 2 | Diode | 980 | 2.10 | Y | LDPE w/No filler |
| 3 | Diode | 830 | 1.75 | Y | LDPE w/No filler |
| 4 | Diode | 980 | 0.83 | Y | LDPE w/No filler |
| 5 | Diode | 980 | 1.67 | Y | LDPE w/Carbon Black Filler |

1. Primary Components to Achieve Laser Marks
   1.1. Laser Energy Density: The energy density (ε) is a measure of how much power is needed to create a mark over a given area in a specific amount of time and is estimated based on the following equations:

$$\varepsilon = \frac{P \cdot t}{A} = \frac{P}{v \cdot d_l}$$

where P—laser power required to make a mark (W),
t—time require to make the mark (s),
A—area that is marked (cm$^2$),
v—velocity of a sample moving past a stationary laser or the velocity of the laser as it moves over a sample (cm/s), and
$d_l$—diameter of the laser spot size (cm).

For example, the energy density required for creating a dark readable mark with a $CO_2$ laser and galvanometer onto LDPE label coated with a thermal chromatic material through the back-side is as follows:

$$\varepsilon = \frac{P}{v \cdot d_l} = \frac{8 \text{ W}}{500 \text{ cm}/s \cdot 0.023 \text{ cm}} = 0.69 \text{ J/cm}^2$$

1.2. Laser Wavelength: The wavelength depends upon the laser source that is selected. The two sources selected were a $CO_2$ and diode laser. Typical laser suppliers are Synrad, Inc., Universal Laser Systems, Inc., JDS Uniphase Corp., Coherent, Inc., Sacher Lasertechnik GmbH, etc.

$CO_2$ lasers have a wavelength between approximately 9,200 and 10,900 nm (lasers are typically specified at 10,600 nm). Diode lasers come in a variety of wavelengths (300 to 2300 nm); however, for this application the most appropriate wavelength range is between 800 and 1600 nm. This range is well past the visible range and within the range of commonly supplied low cost diode lasers.

1.3. Label Substrate Fill Material: The fill material for substrate 361 is selected to accomplish two basic functions: present a suitable background to achieve high contrast with the laser mark and allow high transmittance (or low absorption) of the selected laser wavelength. In other words, the laminate must appear invisible to the laser and white (if mark is black) to the human eye.

The fill material for methods 1 and 2 (see Table 1) is a white master-batch that contains $TiO_2$ at approximately 7.5%. The $TiO_2$ has a particle size of approximately 200 to 220 nm.

For methods 3 through 4, no mater-batch was blown into the label substrate material 361 (typically a polyethylene). Therefore, the material is clear to the human eye and is translucent with respect to the wavelength produce by a diode laser.

For method 5, the NIR absorber which was carbon black was blown into a thin layer on the face of the label substrate.

1.4. Coating: The coating 363 used in this embodiment was a coating commonly used on paper and/or film for direct thermal printing. These coatings typically contain fillers like kaolin clay to provide a surface for the print head to ride; however, this is not needed for this application. Typically the thermal layer must contain three key components—a color former, a color developer and a sensitizer. Heat energy from a laser or a laser's interaction with an absorber causes the sensitizer to melt allowing the color former and developer to come together to mark an image. Companies that supply this type of product are Appleton (www.appletonideas.com), Ciba Specialty Chemicals (www.cibasc.com), Smith and McLaurin LTD (www.smcl.co.uk), etc.

1.5. Laser Sensitive Absorber: NIR absorbers were primarily used with the diode laser source to act as a sink to attract the laser energy. This allows the media to heat up to a temperature required for creating a color change. Typical absorbers can be acquired from the following sources: Exciton (IRA 980B), H. W. Sands (SDA9811), etc.

2. Other Label Material Specifications

There are two different formulation systems to consider for the integration of a laser sensitive agent into or onto the base label material and include:

A. A doped film where the agent is incorporated into the polymer, and

B. A surface coating containing the agent that can be applied to the film surface as a liquid.

Key issues for the development of this material are as follows:

2.1. Safety: The material must not pose more than a minor irritant as a liquid. The coated and laser printed film, including the laser-activated area, must be acceptable for indirect food contact and must be non-toxic when ingested in very small amounts.

2.2. Environmental Concerns: The material and the resultant mark must be rugged, splash proof and durable so as to withstand typical pack-house environments (i.e., ambient temperatures 0 to 45 C, relative humidity to 98% non-condensing.) It must also be able to withstand caustic environments 7-11.5 pH.

2.3. Workability: The coated or filled material must not in any way affect the ability of the finished labels to tack, to adhere or to conform to the fruit surface that are normally labeled.

2.4. Laser Activated Material: It is necessary that the reactive material not emit a toxic smoke or other residues nor leave any toxic residues on the substrate. It is therefore preferable that the laser sensitive agent be placed into the film as a fill (doped) rather than be applied as a coating.

2.4.1. Filler Characteristics—It is essential that the sensitive fill material blends into the base film material. The resultant construction must maintain all core characteristics and properties of the current label material yet react to the laser energy applied to either of its surfaces at the specified energy density.

2.4.2. Coating Characteristics—The following are the major issues concerning the formulation and application of a laser activated coating:

2.4.2.1. Formulation—In-line flexographic printing is preferable coating process. Other processes to be considered if flexograpic printing is inadequate are Rotary Screen, Gravure, etc. Preferred coating should be water based. It should have a shelf life of 6 months for concentrate.

2.4.2.2. Off-line coating—off-line coating prior to conversion could be considered as an alternate if in-line coating is not possible.

2.4.2.3. White, marking black—white, marking black, producing sufficient contrast levels as to give good scanning capability when bar code printed.

2.4.2.4. Flexibility—coating must remain flexible after curing.

2.4.2.5. Over-Printable—coating must be over-printable with standard Flexo inks, without loss of gloss.

2.4.2.6. Secure—coating is to be secure, well keyed to substrate & reasonably rub/scratch resistant.

2.4.2.7. Storage Stability—coating must be stable as a component of a roll product when stored in conditions normally suitable for pressure sensitive adhesives roll products.

2.4.2.8. Print Stability—coating has to be stable when printed on to label surface and exposed to UV light & moisture.

2.4.2.9. Residues—coating is to mark with little or no amount of smoke or residues, all of which must be free of toxins.

2.5. Marking System Characteristics

The marking system must be capable of printing at 12 labels/sec (720 labels/min) which on a label applicator equates to a linear speed of 1.27 m/sec. The label is carried on a bellows with the adhesive side presented to the laser system (i.e., the laser must mark through the adhesive side of the label.) The bellow moves close to constant velocity as it indexes between labeling stations. Therefore, the material must react to the laser energy and mark this example in less than the specified time. Typical laser system specifications for CO2 and diode lasers systems are outlined in the following sections.

2.5.1. $CO_2$ Laser System with Two Axis Scan Head—The following table is a list of laser system specifications:

| Parameter | Value |
| --- | --- |
| Laser Type | $CO_2$ |
| Wavelength | 10.6 μm |
| Power Output | ~10 Watts or more |
| Spot Size | 230 μm |
| Typical Scan Head Speed | 5,000 mm/sec |
| Typical Energy Density | 0.69 J/cm$^2$ |

The most important characteristic is to be able to mark the example shown in FIGS. 11A and 11B while the laser is focused. The depth of field for a typical $CO_2$ laser is approximately 2 mm. The depth of field parameter can be limiting. This is primarily because the laser is trying to mark a target on the bellow as it rotates about an axis. By improving the depth of field, it is possible for the scanning mirror to track the label thereby allowing the laser to focus on the target for a greater amount of time.

2.5.2. Diode Laser System—The following table is a typical list of laser system specifications:

| Parameter | Value |
| --- | --- |
| Laser Type | Diode |
| Wavelength | 808 nm, 830 nm, 980 nm, etc. |
| Power Output | 24 Watts/cm (300 dpi) |
| Spot Size | 80 μm |
| Emitter Spacing | 80 μm (300 dpi) |
| Typical Energy Density | 0.20 J/cm$^2$ (300 dpi) |

The most important characteristic is to be able to mark the example shown in FIGS. 11A and 11B when the labeling system is operating at 720 fruit per min. Another important consideration for this laser system is the energy density which for the system parameters above is approximately 0.20 J/cm$^2$.

Use of Reflective Elements with Direct Thermal Coating

The following method describes how it is possible to use reflective coatings, surfaces or particles to optimize the available laser energy for variably coding laminated labels using the present invention for "on the fly" application for fresh produce. Reflective materials are described in part above in conjunction with FIGS. 5A and 10A-10F. This can be accomplished with all types of lasers specifically $CO_2$ and diode based lasers.

By optimally selecting the material and the finish of the material that carries the laminated label, the laser energy can be directed back into the label to in-effect increase the exposure time. Therefore the overall energy density to which the label is exposed is improved and the resulting mark produced by the laser is darker or a similar mark can be achieved at a greater speed.

As light interacts with a given material it will be reflected, transmitted or absorbed. The thermochromic material applied to the face of the label has been selected to absorb the laser's energy. Even though, 50% or more of the laser energy can be lost (i.e., transmitted or reflected). Therefore, it is preferable to design the surface of the label carrier to reflect as much of the laser energy as possible back into the face of the label. Since lasers can be selected with different wavelength this material must be carefully selected for the desired laser.

EXAMPLE 1

Set-up 1
Laser: 10 Watt CO2 with 2D scan head
Coating: Direct Thermal (Typically found on paper labels used in Direct Thermal Printers)
Laminate: White LDPE
Write Speed: 5000 mm/s
Power: 55%
Label Carrying Material: Black rubber Power was increased in 5% increments until the resultant mark was fully marked. For this setup the power level was 55%.

Set-up 2
Laser: 10 Watt CO2 with 2D scan head
Coating: Direct Thermal (Typically found on paper labels used in Direct Thermal Printers)
Laminate: White LDPE
Write Speed: 5000 mm/s
Power: 45%
Label Carrying Material: Brushed Aluminum Again the power was increased in 5% increments until the resultant mark was fully marked. For this setup the power level was 45%. This was an 18% decrease in power or conversely an increase in overall performance.

EXAMPLE 2

Set-up 1
Laser: 0.20 Watt 980 nm single beam laser
Coating: Direct Thermal (Typically found on paper labels used in Direct Thermal Printers) with NIR absorber mixed into the direct thermal layer.
Laminate: Clear LDPE
Write Speed: 40 cm/s
Power: Watts Label Carrying Material: Black rubber Write speed was increased in 5 cm/s increments until the resultant mark was fully marked (i.e. width of the line equal to the full width half maximum laser parameter—80 um). For this setup the write speed was 40 cm/s.

Set-up 2
Laser: 0.20 Watt 980 nm single beam laser
Coating: Direct Thermal (Typically found on paper labels used in Direct Thermal Printers) with NIR absorber mixed into the direct thermal layer.
Laminate: Clear LDPE
Write Speed: 40 cm/s
Power: Watts
Label Carrying Material: Brushed aluminum Again the write speed was increased in 5 cm/s increments until the resultant mark was fully marked (i.e. width of the line equal to the full width half maximum laser parameter—80 um). For this setup the write speed was 50 cm/s. This was an 18% increase in write speed i.e. an overall increase in performance.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A multi-layered laminate media on which information may be applied in machine or human readable form on a visible front surface of said media by the output of a high intensity light source, comprising:
   a media substrate, said substrate having back and front surfaces,
   a light absorbent layer, said layer adapted to absorb light from said output of said high intensity light source and to convert said absorbed light into heat,
   a thermochromic layer in thermal contact with said light absorbent layer, said thermochromic layer forming said visible, front surface of said media, wherein portions of said thermochromic layer change visual appearance in response to application of said output of said high intensity light source into said light absorbent layer, and conduction of heat converted from light absorbed by said light absorbing layer into said thermochromic layer, and
   obscuration means between said light absorbent layer and said visible, front surface of said thermochromic layer which reduces the visibility of said light absorbent layer to the naked eye, wherein said obscuration means comprises a variable obscuration layer which becomes opaque in selected portions as it absorbs heat.

2. A multi-layered laminate media on which information may be applied in machine or human readable form on a visible front surface of said media by the output of a high intensity light source, comprising:
   a media substrate, said substrate having back and front surfaces,
   a light absorbent layer, said layer adapted to absorb light from said output of said high intensity light source and to convert said absorbed light into heat,
   a thermochromic layer in thermal contact with said light absorbent layer, said thermochromic layer forming said visible, front surface of said media, wherein portions of said thermochromic layer change visual appearance in response to application of said output of said high intensity light source into said light absorbent layer, and conduction of heat converted from light absorbed by said light absorbing layer into said thermochromic layer, and wherein said obscuration means comprises a variable obscuration layer which becomes transparent in selected portions as it absorbs heat.

3. A multi-layered laminate media on which information may be applied in machine or human readable form on a visible front surface of said media by the output of a high intensity light source, comprising:
   a media substrate, said substrate having back and front surfaces,
   a light absorbent layer, said layer adapted to absorb light from said output of said high intensity light source and to convert said absorbed light into heat,
   a thermochromic layer in thermal contact with said light absorbent layer, said thermochromic layer forming said visible, front surface of said media, wherein portions of said thermochromic layer change visual appearance in response to application of said output of said high intensity light source into said light absorbent layer, and conduction of heat converted from light absorbed by said light absorbing layer into said thermochromic layer, and further comprising a reflective coating means adjacent to the front surface of said thermochromic layer for reflecting light from said high intensity light source back into said light absorbing layer.

4. A multi-layer label for use in apparatus for automatically applying labels to individual items of produce, wherein each label has a visible front surface and a back surface and variable coded information is applied to said label in human or machine readable form, wherein a rotary bellows applicator is utilized to transfer individual labels from a label carrier strip onto the tip of a single bellows and thereafter onto individual items of produce, wherein a sensing means senses a variable characteristic of said produce item, wherein the output of a high intensity light source is utilized to apply said sensed variable characteristic through the back surface of each of said labels while each label is on said tip of a bellows, characterized by:
   a plastic label substrate, said substrate having back and front surfaces and being translucent to said output of said high intensity light source,
   a light absorbent layer carried by or embedded within said front surface of said plastic label substrate, said layer adapted to absorb light from said output of said high intensity light source and to convert said absorbed light into heat,
   a thermochromic layer in thermal contact with said light absorbent layer, said thermochromic layer forming said visible, front surface of said label, wherein portions of said thermochromic layer change visual appearance in response to application of said output of said high intensity light source through said substrate into said light absorbent layer, and conduction of heat converted from light absorbed by said heat absorbing layer into said thermochromic layer, and
   wherein said absorbent layer is embedded in said substrate and said thermochromic layer is applied to said substrate by flexographic printing.

5. An automatic labeling machine used to apply labels to produce, wherein a label applicator having a plurality of bellows carried on a rotary applicator head is utilized to transfer individual labels from a label carrier strip, onto the tip of a single bellows, and thereafter onto individual items of produce, each label having a front, visible surface and a back surface, comprising:
  a plurality of plastic labels carried by said carrier strip, wherein each of said plastic labels includes a plurality of layers, including a translucent plastic substrate, a translucent layer of adhesive carried by the back or reverse surface of said substrate, a heat absorbent layer, a light absorbent layer adjacent the front surface of said substrate, and a thermochromic layer adjacent the front surface of and in thermal contact with said heat absorbent layer,
  sensing means for sensing at least one variable characteristic of each of said individual items of produce,
  laser coding means operating in response to said sensing means for producing a variable human or machine readable code representative of said variable characteristic on each individual label when said label is carried on the tip of a bellows and prior to application of said individual label to the particular item of produce for which the variable characteristic was sensed,
  wherein said laser coding means is positioned so that its output is directed at the back surface of a label transferred onto said tip of a single bellows,
  wherein as said laser output passes through said adhesive layer and through said plastic substrate of each label, and is partially absorbed by said light absorbent layer, portions of said thermochromic layer change color in response to application of the output of said laser coding means through said substrate into said light absorbent layer, and conduction of heat absorbed by said light absorbing layer into said thermochromic layer.

6. The apparatus of claim 5 wherein said laser coding means comprises an addressable solid state semiconductor array.

7. The apparatus of claim 5 wherein said heat absorbent layer is selected from the group consisting of carbon black, graphite and carbon nanotubes.

8. The apparatus of claim 5 wherein said plastic substrate is selected from the group consisting of polyethylene, polypropylene and polyester.

9. The apparatus of claim 5 wherein said thermochromic layer comprises a coating including color former, color developer and sensitizer.

10. The apparatus of claim 5 wherein said thermochromic layer further comprises particles to scatter light and provide obscuration of said light absorbent layer.

11. The apparatus of claim 5 wherein said light absorbent layer has less than 100% absorption, so that the distribution of absorption through said light absorbent layer is shifted towards said thermochromic layer.

12. The apparatus of claims 5 wherein said thermochromic layer has a front surface that is the visible surface of said label, and further comprising a reflective coating carried by said front surface of said thermochromic layer to cause said output of said laser coding means to be reflected back into said light absorbent layer.

13. The apparatus of claim 5 wherein said laser coding means is a single $CO_2$ laser.

14. A method of automatically applying labels to individual items of produce, wherein each label contains variable coded information in a human or machine readable form, wherein a rotary bellows applicator is utilized to transfer individual labels from a label carrier strip onto the tip of a single bellows and thereafter onto individual items of produce, wherein a sensing means senses a variable characteristic of said produce items, wherein each of said labels includes a translucent plastic substrate with front and back surfaces, a light absorbent layer adjacent said front surface of said substrate and a thermochromic layer adjacent to and in thermal contact with said light absorbent layer, wherein the output of a laser coding means is utilized to apply said sensed variable characteristics to said labels with their output beam or beams, characterized by:
  applying the output of said laser coding means to the back surface of said translucent label substrate while said label is on said tip of said bellows,
  causing the output of said laser coding means to form said sensed variable characteristic,
  absorbing light energy from the output of said laser coding means in portions of said light absorbent layer and converting said absorbed light into heat,
  conducting heat from said light absorbent layer into said thermochromic layer to cause portions of said thermochromic layer to change color to generate said variable coded information in human or machine readable form.

15. The method of claim 14 wherein said light absorbent layer is selected from the group consisting of carbon black, graphite and carbon nanotubes.

16. The method of claim 14 wherein said light absorbent layer is embedded within said substrate.

17. The method of claim 16 wherein said thermochromic layer is applied to said substrate by flexographic printing.

18. The method of claim 14 wherein said laser coding means comprises an addressable solid state semiconductor array.

19. The method of claim 14 wherein said thermochromic layer has a front surface coated with a material that reflects the output of said laser coding means, comprising the further step of reflecting said output of said laser coding means back into said light absorbent layer from said front surface of said thermochromic layer.

20. The method of claim 14 wherein said thermochromic layer has reflective particles embedded therein that reflects said output of said laser coding means back into said light absorbent layer.

21. The method of claim 14 wherein said thermochromic layer further comprises particles to scatter light and provide obscuration of said light absorbent layer.

22. The method of claim 14 wherein said thermochromic layer comprises a coating including color former, color developer and sensitizer.

23. The method of claim 14 wherein said plastic substrate is selected from the group consisting of polyethylene, polypropylene and polyester.

24. The method of claim 14 wherein said bellows rotates between multiple index positions, comprising the further step of applying said output of said laser coding means to said label as said bellows is rotating between two index positions.

* * * * *